United States Patent [19]
Coplan et al.

[11] Patent Number: 4,631,128
[45] Date of Patent: Dec. 23, 1986

[54] PERMSELECTIVE HOLLOW FIBER BUNDLE

[75] Inventors: Myron J. Coplan, Natick; Fred Bilewski, Medway, both of Mass.

[73] Assignee: Albany International Corporation, Menands, N.Y.

[21] Appl. No.: 501,368

[22] Filed: Jun. 6, 1983

Related U.S. Application Data

[63] Continuation of Ser. No. 212,193, Dec. 2, 1980, abandoned, which is a continuation-in-part of Ser. No. 943,739, Sep. 19, 1978, abandoned.

[51] Int. Cl.[4] .............................................. B01D 31/00
[52] U.S. Cl. ........................... 210/321.5; 210/433.2; 210/488; 210/496; 210/497.1; 55/158
[58] Field of Search .................... 210/321, 323.2, 433, 210/488, 489, 490, 491, 494, 496, 497.1, 497.2, 500.2, 508, 509; 422/48; 55/158

[56] References Cited

U.S. PATENT DOCUMENTS

| | | | |
|---|---|---|---|
| 3,422,008 | 1/1969 | McLain | 210/321 X |
| 3,660,281 | 5/1972 | Tober | 210/321 X |
| 3,702,658 | 11/1972 | McNamara et al. | 210/321.1 |
| 3,708,071 | 1/1973 | Crowley | 210/321 |
| 3,794,468 | 2/1974 | Leonard | 210/321 |
| 3,870,637 | 3/1975 | Miyoshi et al. | 210/243 |
| 4,045,851 | 9/1977 | Ashare et al. | 210/321 X |
| 4,061,574 | 12/1977 | Clark | 210/321 |
| 4,224,094 | 9/1980 | Amicel et al. | 156/443 X |

OTHER PUBLICATIONS

Gill, W. N. et al., "Hollow Fiber Reverse Osmosis System Analysis and Design", A. I. Ch. E. Journ. (vol. 19) No. 4, Jul. 1973, pp. 823-831.

Primary Examiner—David Sadowski
Attorney, Agent, or Firm—Kane, Dalsimer, Kane, Sullivan & Kurucz

[57] ABSTRACT

A bundle of helical segments of permselective hollow fibers for use in a separatory module, all segments being limited in length to not over 1.1 times a selected value and all helical paths being arranged to avoid the creation of undesirable ridges and method for producing.

10 Claims, 18 Drawing Figures

PERMSELECTIVE HOLLOW FIBER BUNDLE

The government has rights in this invention pursuant to Contract No. 14-34-0001-7508 awarded by the Office of Water Research and Technology of the United States Department of the Interior.

CROSS REFERENCE TO RELATED APPLICATION

This application is a continuation of copending U.S. application Ser. No. 212,193 which was filed on Dec. 2, 1980 now abandoned which was a continuation-in-part of U.S. application Ser. No. 943,739 which was filed on Sept. 19, 1978 now abandoned.

BACKGROUND OF THE INVENTION

The use of membranes to effect separation of gas/gas, liquid/liquid, and liquid/solid mixtures and solutions has achieved general industrial applicability by various methods, among them being ultrafiltration, hyperfiltration, reverse osmosis, dialysis. In general, membrane elements associated with these processes are contained in vessels called modules, comprising a container having various inlet and outlet ports and an assembly of membranes within said container. The internal configurations are so arranged as to permit the introduction of a feed stream with or without pressure on the upstream face of the membranes, means for collecting permeate which passes through the membranes and emerges on their downstream faces, and means for keeping feed and permeate materials from commingling.

Membranes have been fabricated in various shapes, such as (1) flat sheets which may be supported in a typical plate and rame structure similar to a filter press; (2) flat sheets rolled into spirals with spacing materials interleaved with the membrane and the assembly sealed to provide spiroidal channels permitting the passage of a feed on one side of the coiled membrane through spaces to the opposite side of the membrane; (3) as tubes lining the inner surface of a reinforced braid, the braid itself at times being a component in a larger tube; and (4) in the form of open-ended hollow fibers so organized and sealed into header plates as to provide a separation of the flows over the external surfaces of the hollow fibers from any flow within the bores of the hollow fibers ensuing by virtue of passage of permeant across the membrane.

The subject invention is concerned with the use of hollow fibers assembled in modular form to provide the desired separation.

It has been commonly assumed that hollow fine fiber reverse osmosis modules are advantageously fabricated having an extremely high fiber packing density, combined with relatively small diameter fibers. Thus it has been considered desirable to provide a pressure vessel containing extremely high surface areas of membrane per unit volume of vessel. This feature is often presented as one of the principal areas of superiority for the hollow fiber system.

This arrangement inevitablly contributes to a number of significant problems. First, it is relatively difficult to maintain uniform, extremely close packing among cylinders such as fibers unless they are quite parallel and uniform in diameter. In conventional hollow fine fiber modules, this condition is approached but not generally fully met. As a result, there is a distribution of packing densities of the fibers within the module so that some inter-fiber capillary channels may be essentially stagnated, and in other regions fiber spacing is wide enough to permit fairly ready passage of the pressurized feed solution. As a result, during operation different regions within the module are likely to present different flow conditions to the feed solution, resulting in variable conditions of transmembrane effective pressure, concentration polarization, and susceptibility to accumulation of deposits of adventitious particles or precipitated salts from the feed stream.

The problem of membrane fouling due to retention of suspended particles is also very prominent in conventional modules. Feed streams inevitably contain varying amounts of suspended particulate matter. Although extreme precautions are generally taken to prefilter the feed stream or otherwise remove the suspended particles prior to admitting the feed to the modules, the conventional hollow fine fiber modules ultimately become effective collectors for much of this material.

Tightly packed hollow fine fiber bundles develop occluded regions and lose effective membrane areas.

Apart from adverse shellside flow considerations such as described above, it can be shown that the parasitic pressure loss due to bore flow resistance is an exponential function of both fiber length and bore diameter. With relatively low intrinsic membrane transport capabilities, fairly fine fibers can be tolerated, but only up to a limit in length. However, where intrinsic membrane permeability is high (i.e., high flux at a particular applied pressure), the fiber length and bore diameter strongly influence pressure losses which may become a major limiting factor in module productivity.

These deficiencies, among others, of conventional tightly packed fine hollow fiber modules have heretofore prevented maximum utilization of the advantages to be gained by the use of hollow fibers in separatory applications.

SUMMARY OF THE INVENTION

This invention presents a new hollow filament separatory module and method of fabricating the same which includes unique features enabling the maximization of use of the attributes of hollow fibers for the purpose.

The invention contemplates fibers of selected diameters consistent with the flow requirements of high flux membranes. For example, by our methods we are capable of utilizing fibers with diameters as little as $100\mu$ to as much as $500\mu$ or more. The specific dimensions of length and diameter of fibers can be very important, depending upon the application. The present invention allows for easy selection of these dimensions. In reverse osmosis applications, we prefer fibers at least in the order of $250\mu$ in diameter. Additionally, by winding the fibers in a helical fashion with adjacent layers wound in opposite hand there is provided more uniform distribution of the channel spaces and surfaces of the fibers usable for separation.

Thus, while conventional teachings have considered 50–100 microns as the typical range of outside diameter for the hollow fine fiber membrane, we prefer the hollow fiber having diameters of 250 microns or larger. Indeed, in some cases we have made very successful use of fibers over 500 microns in outside diameter.

We prefer to use a composite hollow fiber comprising a porous substrate, overcoated with a selected high filtration rejection barrier. This permits us to select fiber outside diameter, wall thickness, and rejective topcoat layer independently of one another, and thereby optimize the hydraulic and mechanical features, such as resistance to collapse under external pressure.

A principal feature of this present invention relates to the design and method of fabrication of bundles of permselective hollow fibers which overcome problems of parasitic pressure losses associated with bore flow within a hollow fiber.

A second principal feature of this invention relates to the design and method of assembling bundles of helically wound fibers without the creation of objectionable ridges of helically wound fibers.

A more particular feature of this invention is the description of a bundle of permselective hollow polymeric fibers comprising helically wound segments wherein the segment lengths satisfy requirements for optimization of flux and rejection properties and the bundle does not possess objectionable helical ridges of fiber wraps.

Various other improvements in the design and methods of fabrication of separatory modules employing helically wound fibers have been taught in our issued patents. U.S. Pat. Nos. 4,207,192; 4,210,536; and 4,220,489.

DESCRIPTION OF THE INVENTION

It has been demonstrated that with inherently high flux membrane capabilities, that is with membranes of high inherent hydraulic permeability, unless due account is taken of fiber length and bore diameter, adverse results will occur. The results are an increase in percent salt passage and a decrease in the effective use of surface of the fiber in respect to the nominal "zero"-length flux. In effect, both flux and rejection are diminished when fibers are "too long" relative to their bore size and inherent permeation rate.

Examples of the adverse effect of excessive fiber length are provided below. It should be noted that it is possible to use hollow fibers in reverse osmosis either with the bore open at one end and sealed at the other, or with the bore open at both ends. In the former case, the open fiber end is sealed in a mass of potting medium and its bore discharges into a low pressure permeate collection zone or chamber. The closed end may be potted into a resin mass or the like to help support one end of the bundle of which the fiber is a member.

In the case of both bore ends open in each fiber length, both ends of the fiber must be sealed in a potting medium in such a way that the bore discharge exits into low pressure permeate collection zones or chambers. The two ends of any one fiber may appear in the same mass of potting medium and each bore exit may discharge to the same collection zone, or the fiber may be potted in such a way that each bore exit discharges into a separate collection zone.

Generally, when both open ends appear in the same mass of potting medium and the bore exits discharge into the same collection zone, the length of fiber between the cut ends comprises some form of loop. The loop may be of simple fairly straight-legged hairpin shape, or it may follow a more intricate spatial path in two or three dimensions. However, if each fiber end is potted in separate sealing masses, the fiber shape between the cut ends conceivably could be quite straight or could follow an infinite variety of either random or geometrically organized paths.

We generally prefer to arrange our fibers in helical paths, the axis thereof being congruent and parallel to the principal direction of flow of the pressurized feed. The cut fiber ends may be sealed into the same mass of potting medium and discharge into a common chamber, or they may be sealed into two separate masses of potting medium, and discharge into two separate zones, generally at opposite ends of the axis of the fiber helix. In the specification and claims the term lamella is used to mean wraps of fiber which have the same number of turns per unit of distance running the length of the bundle.

For purposes of considering the examples illustrating the adverse effect of fiber length on bore flow effects, the actual path shape of each fiber need not be considered. It is important however to take numerical account of the consequence of operating with one sealed end versus both ends open. In the sealed-end case, it is obvious that flow within the fiber bore can only be from the sealed end toward the open end. In the two-ends-open case, flow within the fiber bore is bi-directional with respect to some point or zone along the fiber path. That is to say, there must be a stagnation point or region in the bore corresponding to the sealed end of the one-end-open case; bore flow on one side of said point or zone will be toward the bore exit at the one cut end, while bore flow on the other side of said zone will be toward the bore exit at the other cut end. Thus, a position approximately half-way along the path between the ends of a two-end open fiber corresponds to the sealed end of a one-end open fiber.

Reference is made herein to a length, L, as the path length between the cut ends of double-open-ended fiber. It should be borne in mind that for single-open-end cases the fiber length from closed to open end ordinarily corresponds to one-half of a length associated with a two-end open case. The corresponding set of fiber properties and module operating conditions will result in limits on length from cut end to sealed end essentially one-half that allowable for the path length between the ends of a two-open-end configuration.

We prefer to employ in our system fibers with both ends open. We have found that there is a unique relationship between various geometric and hydraulic features of the module and its operation that must be met to achieve superior results in module productivity and the rejection qualities of the permeate. Thus, we provide in our method that in the case of both ends open the path length between the open ends of each fiber must not exceed a certain value, "$L_{crit}$", (in cm.) and in the case of only one bore end open, the distance from closed to open end must not exceed one-half L crit. The actual value of L crit depends upon the variables: fiber O. D., fiber I. D., effective driving pressure, and fiber inherent flux at said pressure. Accordingly, we calculate the limiting length criterion from the following equation:

$$L_{crit} = \sqrt{\frac{(P - \Delta\pi) \times (ID)^3 \times (R)}{50\,F}}$$

where:
P = Module inlet feed pressure in $Kg/cm^2$
$\Delta\pi$ = Osmotic pressure difference between feed solution and permeate in $Kg/cm^2$
ID = Filament internal diameter in microns ($\mu$)
R = Ratio of filament inside diameter to outside diameter
F = Flux of filament based on its outside diameter at the effective operating pressure, expressed as a velocity of microns per second ($\mu/sec.$).

The operation of this relationship will be illustrated in several following examples. In each instance a group of fibers was formed into a loop, and the legs of the loop of fibers sealed in a potting medium and open ends of fiber exposed all on one side of said medium. The lengths of fiber loop on the opposite side of the medium were mounted inside pressure tubing and subject to flowing feed of salt solution under pressure. The length of loop, L, was taken as the overall distance from one cut end to the other cut end of the fiber, substantially all of said length being within the pressurized feed zone, and a relatively inconsequential amount comprising the length of fiber in the potting medium. A slight correction might be made for the so-called "inactive length" of fiber sealed in the potting medium. It will be recognized by one familiar with the art, however, that this length represents a small fraction of the "active length" of fiber. Correction for the portion of "inactive length" is quantitatively unimportant when the ratio inactive length/active length is about 0.1 or less; for all practical cases this requirement is easily met.

All the fibers employed in the examples below were a composite of polysulfone substrate with a rejection barrier of sulfonated polyfuran resin. The outside diameters were all 250$\mu$ and inside diameters 80$\mu$ (within tolerances of $\sim \pm 5\mu$). The several samples were selectd to cover a fairly wide range of flux and rejection properties.

Each sample was prepared with different end-to-end lengths. Each sample was tested for permeate flux and rejection of 2000 ppm NaCl solution at 58 $Kg/cm^2$ applied pressure down to as low as 14.5 $Kg/cm^2$ applied pressure (200 psi). The osmotic pressure ($\Delta\pi$) of the feed is taken as 1.4 $Kg/cm^2$.

Figure 15:
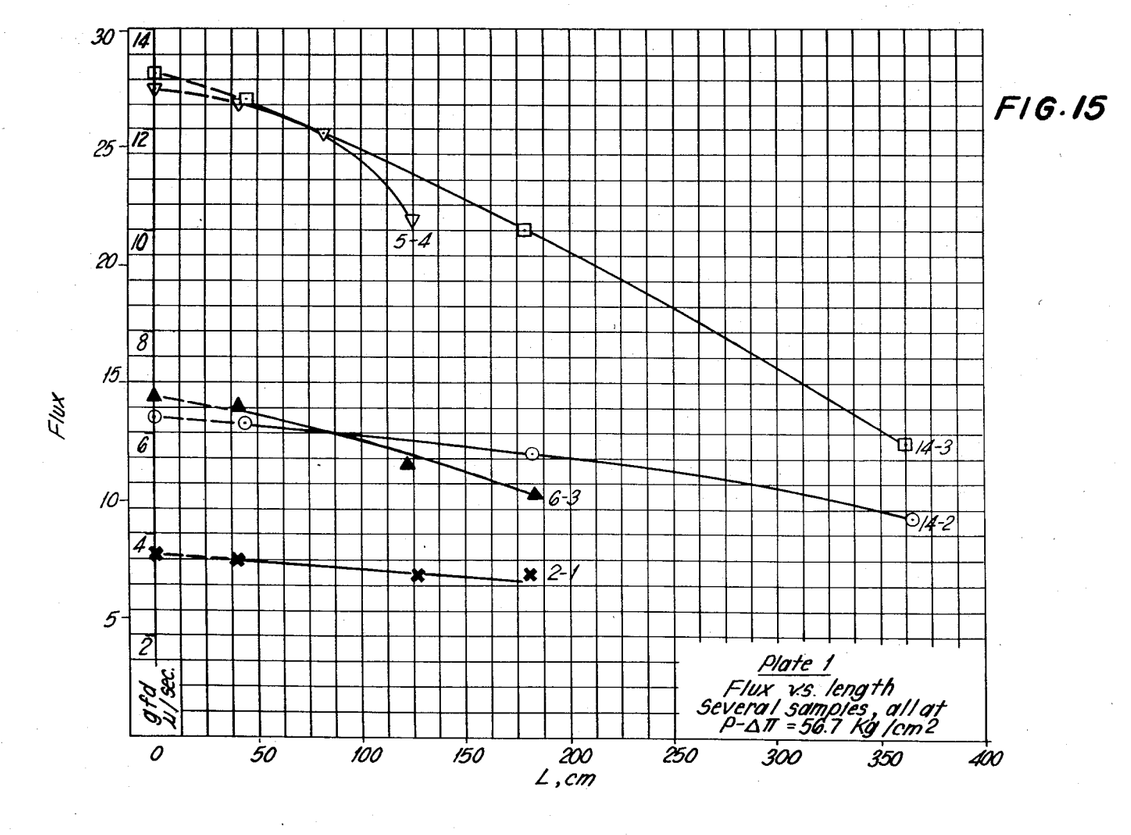
FIG. 15, plate 1 represents a graph of flux vs. length of several samples.
Figure 16:
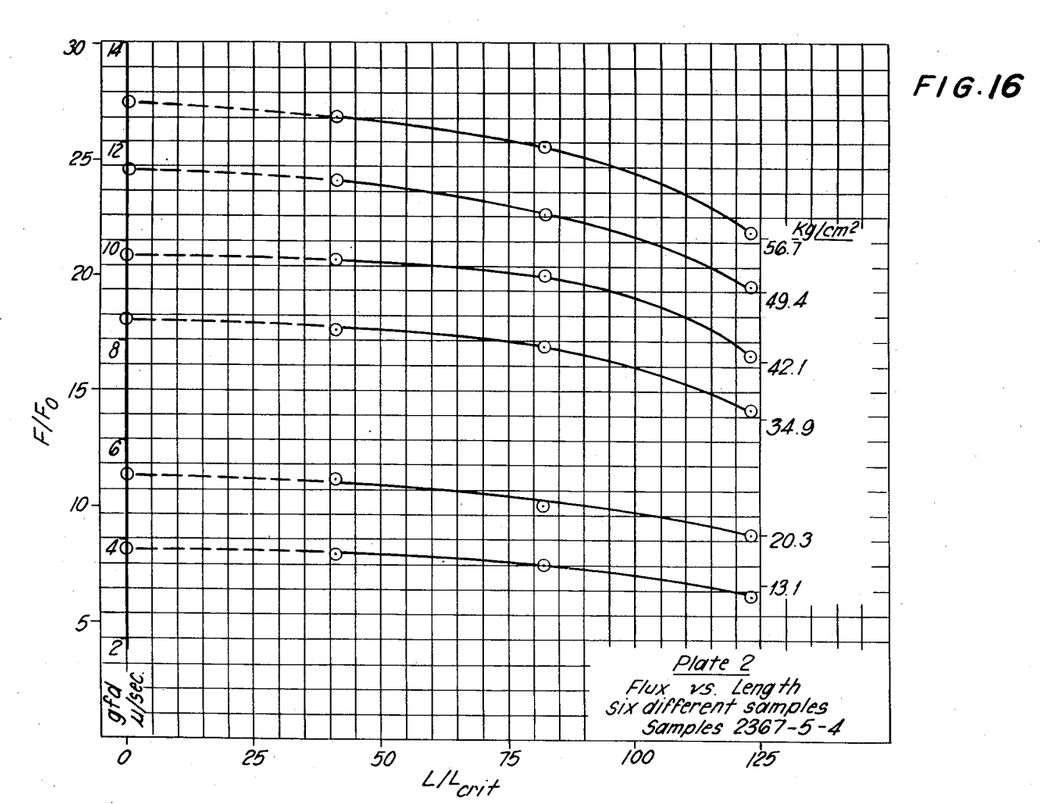
FIG. 16, plate 2 is a graph of flux vs. length of six different samples.

The flux and rejection of each fiber sample were measured at each of three fiber lengths and comprise the experimental data appearing in Tables IA and IB. Flux was plotted vs. length as shown in Plates 1 and 2. Fairly reliable extrapolations to "zero" length flux were made on these plots and are included in parentheses in the tabulated property values shown in Tables IA and IB. Included also in the Table are the values of $L_{crit}$ calculated by use of Equation (1) for each fiber sample and operating pressure. Using these several calculated values of $L_{crit}$, hereinafter sometimes referred to as $L_c$; the ratio of $L/L_c$ for each sample length was calculated and are also presented in the Table. Rejection is calculated in the conventional fashion, R=100, (1-salt conc. permeate/salt conc. feed). Flux is presented both as gallons per sq. ft. per day (gfd) and the velocity parameter, microns per second ($\mu/sec.$). These are related by 1 gfd = 0.466 $\mu/sec$. The ratio of flux at any given length to "zero"-length flux, $F/F_o$, is also tabulated.

TABLE I

| Flux and Rejection vs. Fiber Length | | | | | | | | | |
|---|---|---|---|---|---|---|---|---|---|
| A. Several Different Fiber Samples at One Pressure, P − $\Delta\pi$ = 56.7 $Kg/cm^2$ | | | | | B. One Fiber Sample, 2367-5-4, at Several Pressures | | | | |
| L | $L/L_c$ | Flux | | $F/F_o$ | Rej. | L | $L/L_c$ | Flux | | $F/F_o$ | Rej. |
| (cm) | — | (gfd) | ($\mu$/sec) | — | (%) | (cm) | — | (gfd) | ($\mu$/sec) | — | (%) |
| SAMPLE 2292-14-2, $L_{crit}$ = 173 cm. | | | | | | P − $\Delta\pi$ = 13.1 $Kg/cm^2$, $L_{crit}$ = 108 cm. | | | | | |
| 0 | 0 | (13.6) | (6.3) | — | — | 0 | 0 | (8.2) | (3.8) | — | — |
| 43 | .24 | 13.3 | 6.2 | .98 | 99.0 | 41 | .38 | 8.0 | 3.7 | .98 | 97.1 |
| 182 | 1.05 | 12.1 | 5.6 | .89 | 98.3 | 82 | .76 | 7.6 | 3.5 | .93 | 96.6 |
| 365 | 1.99 | 9.2 | 4.3 | .68 | 92.8 | 123 | 1.14 | 6.2 | 2.9 | .76 | 96.5 |
| SAMPLE 2292-14-3, $L_{crit}$ = 121 cm. | | | | | | P − $\Delta\pi$ = 20.3 $Kg/cm^2$, $L_{crit}$ = 113 cm. | | | | | |
| 0 | 0 | (28.2) | (13.1) | — | — | 0 | 0 | (11.3) | (5.3) | — | — |
| 44 | .36 | 27.1 | 12.6 | .96 | 99.1 | 41 | .36 | 11.1 | 5.2 | .98 | 97.7 |
| 178 | 1.47 | 21.5 | 10.0 | .76 | 98.9 | 82 | .73 | 10.1 | 4.7 | .89 | 97.8 |
| 362 | 2.99 | 12.5 | 5.8 | .44 | 89.7 | 123 | 1.09 | 8.7 | 4.1 | .77 | 97.2 |
| SAMPLE 2292-6-3, $L_{crit}$ = 170 cm. | | | | | | P − $\Delta\pi$ = 34.9 $Kg/cm^2$, $L_{crit}$ = 118 cm. | | | | | |
| 0 | 0 | (14.4) | (6.7) | — | — | 0 | 0 | (18.1) | (8.4) | — | — |
| 41 | .24 | 14.0 | 6.5 | .97 | 99.4 | 41 | .35 | 17.7 | 8.2 | .99 | 98.5 |
| 122 | .68 | 11.5 | 5.4 | .80 | 99.1 | 82 | .69 | 17.0 | 7.9 | .94 | 98.5 |

TABLE I-continued

Flux and Rejection vs. Fiber Length

| A. Several Different Fiber Samples at One Pressure, $P - \Delta\pi = 56.7$ Kg/cm² | | | | | B. One Fiber Sample, 2367-5-4, at Several Pressures | | | | | |
|---|---|---|---|---|---|---|---|---|---|---|
| L (cm) | L/$L_c$ — | Flux (gfd) | Flux (μ/sec) | F/$F_o$ — | Rej. (%) | L (cm) | L/$L_c$ — | Flux (gfd) | Flux (μ/sec) | F/$F_o$ — | Rej. (%) |
| 183 | 1.08 | 10.3 | 4.8 | .72 | 97.8 | 123 | 1.04 | 14.2 | 6.6 | .79 | 97.8 |
| SAMPLE 2292-2-1, $L_{crit} = 230$ cm. | | | | | | $P - \Delta\pi = 42.1$ Kg/cm², $L_{crit} = 120$ cm. | | | | | |
| 0 | 0 | (7.7) | (3.6) | — | | 0 | 0 | (20.7) | (9.7) | — | |
| 40 | .17 | 7.6 | 3.5 | .99 | | 41 | .34 | 20.5 | 9.6 | .99 | 98.6 |
| 127 | .55 | 6.8 | 3.2 | .88 | 98.6 | 82 | .68 | 20.0 | 9.3 | .97 | 98.7 |
| 181 | .79 | 6.9 | 3.2 | .90 | 98.9 | 123 | 1.03 | 16.6 | 7.7 | .80 | 98.2 |
| SAMPLE 2367-5-4, $L_{crit} = 122$ cm. | | | | | | $P - \Delta\pi = 49.4$ Kg/cm², $L_{crit} = 120$ cm. | | | | | |
| 0 | 0 | (27.4) | (12.8) | — | | 0 | 0 | (24.5) | (11.4) | — | |
| 41 | .33 | 26.8 | 12.5 | .98 | 98.7 | 41 | .34 | 24.1 | 11.2 | .98 | 98.6 |
| 82 | .67 | 25.6 | 11.9 | .93 | 98.9 | 82 | .68 | 22.1 | 10.5 | .92 | 98.7 |
| 123 | 1.01 | 22.0 | 10.2 | .80 | 97.8 | 123 | 1.03 | 19.6 | 9.1 | .80 | 98.0 |

Figure 17:
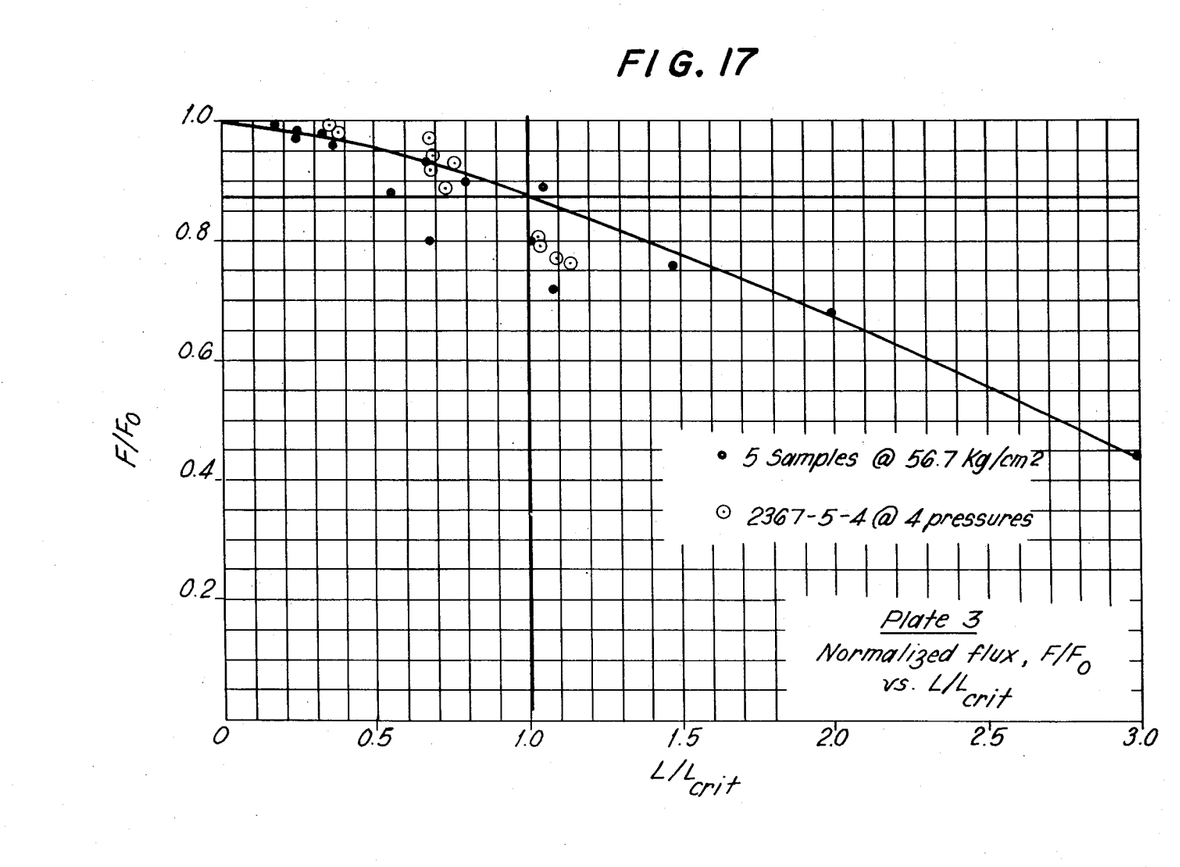
FIG. 17, plate 3 is a graph of normalized flux.

The data in Table I clearly indicate that both flux and rejection decline with increasing length of fiber, L. A consistent analysis of the effect of L on flux appears in Plate 3, where the ratio of flux at any length to "zero"-length flux (F/$F_o$) is plotted against the ratio of the fiber length under test, L, to the critical fiber length, $L_c$, calculated according to Equation 1, (L/$L_c$). The points are clearly distributed in such a way that the graph can be partitioned into four quadrants by a vertical line corresponding to L/$L_c$=1 and a horizontal line corresponding to F/$F_o$=0.88. At values of L less than $L_c$, the flux is 87.5% of the "zero"-length flux or greater for all but 1 of 15 points; at values of L greater than $L_c$, the observed flux is 83% of the "zero"-length flux or less for 7 of 8 points. When L is as great as 2 to 3 times $L_c$, the experienced flux can fall to as little as 40%-50% of the "zero"-length flux.

Figure 18:
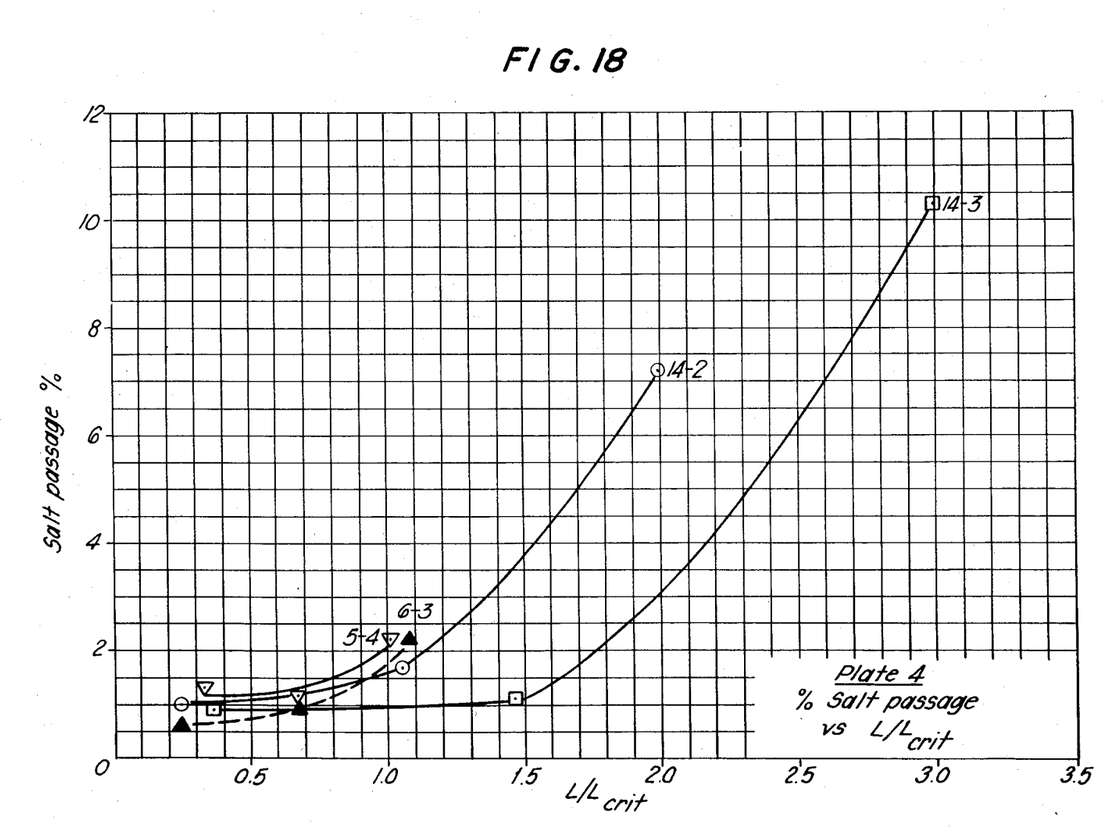
FIG. 18, plate 4 is a graph of percent salt passage vs L/L crit.

The effect of length on rejection shown in Table I is also represented in Plate 4 for several of the samples. For this plot, the value % Salt Passage is used and found from: Salt Passage=(100%−% Rejection). The % Salt Passage is plotted against the ratio L/$L_c$ in Plate 4. It will be seen that as L increased toward $L_c$, % Salt Passage rises only a few tenths of a percent, but at L/$L_c$=1, % Salt Passage starts to rise fairly rapidly.

It will be seen, therefore, that the critical end-to-end length, $L_c$, calculated through the equation set forth above can be used as a practical criterion for preserving both a high percentage of "zero"-length flux and the superior salt rejection properties attendant therewith. In a corollary sense, constructing modules with fibers of end-to-end length greater than $L_c$ should be avoided, since there is both a fairly significant loss of permeate production efficiency as well as a degradation in permeate quality that can become intolerable. The exact value of $L_c$ does not, however, always determine an absolute boundary of acceptable performance. It might well be that "zero"-length flux and rejection values are so favorable that a flux efficiency of somewhat less than 0.85 could be tolerated along with a few percent increase of salt passage. In recognition of this, we use limit of +10% over $L_c$ for practical module fabrication.

Reference to the prior art does not reveal a single practical teaching as to how to avoid or overcome the problem of parasitic bore flow pressure losses. For example, Leonard, in U.S. Pat. No. 3,794,468; Crowley in U.S. Pat. No. 3,708,071; Tober in U.S. Pat. No. 3,660,281; McLain in U.S. Pat. No. 3,422,008; and Clark, in U.S. Pat. No. 4,061,574 all employ hollow semipermeable filaments in various assemblies for osmotic or dialytic separation purposes. All are silent as to the effect of fiber length on separation efficiency and effectiveness; several even contemplate winding helical bundles, and make no reference to the control of helix path length. Although Miyoshi, in U.S. Pat. No. 3,870,637, recognizes the importance of fiber length on permeation and separation performance, his teachings are incomplete and do not solve the problem. Miyoshi fails to take into account the crucial relationships of solution osmotic pressure, effective drive pressure, and membrane hydraulic permeability in developing a fiber length criterion. If one attempts to apply the formulation proposed by Miyoshi in practical examples, utilizing the fiber length criterion proposed by him a fiber of negative length is frequently recommended. Miyoshi also teaches the use of an exact constant fiber length, which results in problems of helical fiber winding as will be described, herein.

In a principal embodiment of our invention a bundle of fibers is constructed by wrapping one or a group of fibers continuously around a rotating mandrel while continuously reciprocatively moving the point of winding parallel to the axis of the mandrel, reversing the direction of such traversing motion at fixed positions a distance, D, apart along said mandrel. The fiber or group of fibers, as a result of the combined rotational motion of the mandrel and reciprocating motion of the traversing guide assume helical paths having N turns over distance D.

At each end of the traverse stroke the path shape of the fiber reverses from a right-hand helix to a left-hand helix or vice versa. After a few full traverses there has been laid down on the mandrel a succession of helical wraps of opposite hand, and successive wraps are then applied not on the mandrel but on a layer of previously applied fibers which layer is of ever-increasing thickness. As a preferred optional embodiment we frequently first install on the mandrel a tubular textile sheath such as a braid upon which the first wraps of fibers are wound.

There is accumulated on the mandrel or on the sheath-covered mandrel a bundle of filaments in the form of a hollow right circular cylinder of length D having an inner circular cross-sectional radius $R_i$, corresponding to the mandrel or sheathed-mandrel radius, and an outer circular cross-sectional radius $R_o$, corresponding to the maximum radius attained by the outermost wraps applied during the bundle build-up. Each fiber follows a helical path on the surface of an imaginary right circular cylinder of length D and radius $R_f$ lying intermediate of $R_i$ and $R_o$ whereas $R_f$ is the radius of an imaginary right circular cylinder upon which a fiber lies in a helical path. The straightened length, S, of each fiber segment lyin between the reversal positions, at the ends of the bundle will be found from the relationshp $$S = \sqrt{N^2 R_f^2 4\pi^2 + D^2}$$

If N is kept constant as the value of $R_f$ increases, the length, S, increases. In other words, if rotational and traverse velocities are kept constant or at least kept at a constant ratio to one another, the helices of larger radius will produce longer straightened fiber lengths, S, over the constant bundle length D. If one desires to keep the value S below some specified value as the bundle builds from radius $R_i$ to radius $R_f$, it will be necessary to control N as $R_f$ increases so that the product $N \cdot R_f$ is kept below some specified value. Maintaining a specific helix length constant by continuously and uniformly reducing N as $R_f$ increases so that $N \cdot R_f$ is constant causes a problem that can be appreciated from the following exposition.

First, consider that N might be either a whole or fractional number. That is, over the bundle length D, the number of turns, N, could be exactly 1, 2, 3, etc., or somewhat more than 1, but not 2, etc. It is useful to consider N as comprised of a whole portion, W, and a fraction, F. For example, $N=4\frac{1}{2}$ would be represented as $W=4$, $F=\frac{1}{2}$. In subsequent discussion, the particular value of W is generally immaterial in determining the effect of controlling the value of F.

If $F=0$, that is, if there is an exact whole number of turns completed at the helix reversal points at the bundle ends, each left-hand helix is laid down directly atop a predecessor left-hand helix, and each right-hand helix is also laid down directly atop a predecessor right-hand helix. For this discussion, such left-hand helices are considered to follow an identical helical path, although successive wraps lie at incrementally greater radii. Likewise, for right-hand helices. Fiber wraps, therefore, build into ridges corresponding to the crowns of screw threads. The point of reversal of each wrap at each bundle end occurs at an identical circumferential position. In the case of $F=0$, the reversal points are at the same circumferential position at the two bundle ends.

If $F=\frac{1}{2}$, once again all left and all right helices follow identical (respectively right and left) paths and lie atop predecessor wraps of the same sense. In this case, however, the reversal positions at the opposite ends of the bundle are displaced 180° around the bundle circumference. If an initial helix reversal position at one end is assigned circumferential position 0°, the reversal at the opposite end will be found at circumferential position 180°. Upon return to the first end, the wrap of fiber will again reverse its helical sense at the circumferential position 0°.

If $F=\frac{1}{3}$, a new situation arises. Again, assign the starting circumferential position at one end where a first reversal occurs as 0°. The reversal point at the opposite bundle end will then occur after W plus $\frac{1}{3}$ turns, or at a circumferential displacement of 120° (as viewed from the starting end). Upon return to the first end, the helical wrap will again make W plus $\frac{1}{3}$ turns before making a reversal. This will occur, therefore, at circumferential position 240° at the starting end. After another complete circuit of $W+\frac{1}{3}$ turns to the second end and $W+\frac{1}{3}$ turns to the first end, the circumferential position of reversal at the first end has been displaced to 120°. At the completion of the next full circuit the reversal point at the first end has returned to circumferential position 0°, or 360°, which are identical. Continuation of the winding process will then lay down helices of common helical path lying in three ridges of lefts and three ridges of rights. They will share the common reversal positions of 0°, 120°, and 240° at each end of the bundle.

Analysis shows that if $F=\frac{1}{4}$, reversal occurs at circumferential positions 0° and 180° at the first end and 90° and 270° at the second end of the bundle. Thus, there are a pair of ridges of left helices following identical paths and a pair of rights. In fact, it can be shown that for all rational fraction values of F, when the denominator is odd the number of ridges will be the same as the denominator; when the denominator is even there will be half as many ridges as the value of the denominator. Thus, if $F=1/5$, $2/5$, $3/5$, or $4/5$, there will be 5 sets of right and left helical ridges. For $F=\frac{1}{8}$, $\frac{3}{8}$, $\frac{5}{8}$, and $\frac{7}{8}$, there will be four sets of ridges. For $F=2/8$, $6/8$, the fractions reduce to $\frac{1}{4}$ and $\frac{3}{4}$ respectively and there will be only 2 sets of ridges, and since $F=4/8$ reduces of $\frac{1}{2}$, there will be only one set of ridges in this case.

The fewer the number of ridges, the more intense is the effect on the building of an irregular fiber bundle. For $F=n/9$ (where n does not permit reducing the denominator: e.g., 7/9) there will be nine sets of ridges. The helical path reversals will appear at 40° displacements around the circumference and the ridge building cannot occur until the 10th wrap starts. When $F=n/8$ (e.g., $\frac{3}{8}$), however, there will be only four sets of ridges displaced 90° around the circumference and ridge building starts at the 5th wrap and occurs at about twice the rate as in the case of $F=7/9$. These latter ridges will be less tall and less discernible being more closely spaced. Nevertheless, after a few dozen wraps even with $F=n/9$, discernible undesirable ridging does occur.

In our invention, values of N are always selected so that their fractional components, F, do not contribute to discernible undesirable ridging. How these can be determined will be illustrated shortly. However, it is important to realize that no single value of N can be maintained throughout the winding of a bundle whose outer radius, $R_o$, is reasonably larger than its inner radius, $R_i$, without creating a violation of the $L_{crit}$ criterion. That is, as $R_f$ increases, the product $N \cdot R_f$ will increase and the result may be that L exceeds $L_{crit}$ by an unacceptable amount unless the value N is reduced.

One might consider programming the ratio of rotational and traverse velocities so that N is continuously reduced as the bundle radius increases. However, this will quickly lead to the ridging problem. For example, assume that a bundle winding process is started using the value $N=4.2691$, at an initial winding radius $R_i$. The value $F=0.2691$ happens to be one which avoids the creation of ridges. However, as wraps are applied and the radius grows, if N were controlled to decrease continuously, the value $N=4.25$ would soon be reached. Now, the situation where $F=\frac{1}{4}$ would occur and severe ridging would set in.

In the present invention we avoid this problem by selecting a series of discrete ratios of the winding and traverse rates and changing from one ratio to the next during the winding at predetermined annular positions. Each such annular position is designated a "change radius," $R_c$. Any one $R_c$ represents the outer radial boundary of one lamella of fiber wraps and the inner boundary of another contiguous and larger lamella.

A first value of N is selected so that helix paths do not repeat their position, thereby avoiding ridges during the winding of fibers from the initial helix radius, $R_i$, to the first change radius, $R_c$, equal to or less than 1.2 times $R_i$. Thus, any straightened length, S, of a wrap applied up to that position will be within about 10% of the median length helix which is found at a radius half way between $R_i$ and $R_c$. The layer of wraps between $R_i$ and $R_c$, therefore, may be described as a lamella of assembled helices sharing a common value of N. If this value of N has been properly selected so that the median length helix (lying half way between $R_i$ and $R_c$) conforms to the proper use of the $L_{crit}$ criterion, all wraps comprising this lamella will be within ±10% of the prescribed length.

When this first lamella has been built up on the mandrel, a new value of N is selected so that the straightened lengths will be kept within 10% of the predetermined length limit. Thus, at the position approximately 1.2 $R_i$ or less, a discrete reduction in the value N is made, and winding continued until a second lamella of wraps has built to the point where its outer radius is not over 1.2 times its inner radius. This second value of N is selected so that no helix wraps repeat their path within the second lamella and so that the median length of a wrap in the second lamella lies within a few percent of the median value of wrap length in the first lamella and hence within a few percent of the length prescribed by the $L_{crit}$ criterion.

The process of winding and changing N at successive positions of $R_c$ each no more than about 20% greater than a previous such position where N was changed is continued until a final radius $R_o$ is achieved. The bundle of inner radius $R_i$ and outer radius $R_o$ comprises a series of contiguous lamellae of wraps within each of which helices have been wound at a given value of N. In each lamella the value of N avoids the building of ridges and from lamella to lamella the value is reduced discretely to provide for the requirement that the critical length criterion as prescribed by the $L_{crit}$ formulation is met. N in all cases is a fractional number, composed of a whole component, W, and a fractional component, F. While the combined value of W and F determine compliance with the $L_{crit}$ criterion, only F enters into the control of ridginess.

The effect of F and one method of controlling it to avoid ridging may be illustrated using sample 2292-14-2 of Table I as an example. This sample, at the operating conditions specified in that Table was shown to have a value for $L_{crit}$ of 173 cm. If it is to be wound into a bundle with a length of D=25 cm, and all fibers are opened at both ends which are potted and appear only at one end of the bundle, and if the bundle is started by winding on a mandrel 1.25 cm. in radius, the following values apply for the first lamella $$S = \frac{L_{crit}}{2} = \frac{173 \text{ cm}}{2} = 86.5 \text{ cm.}$$

$$D = 25$$

$$R_f = \frac{R_i + R_c}{2} = \frac{1.25 + 1.50}{2} = 1.375 \text{ cm.}$$

and N can be determined from $$S = \sqrt{4\pi^2 N^2 R_f^2 + D^2}$$

$$(86.5)^2 = N^2 \cdot (1.375)^2 4\pi^2 + (25)^2$$

$$N = 9.5868151 \ldots$$

For practical purposes, the value of N for the first lamella should be selected at or near 9.587, which represent W=9 and F=0.587. This value for F is not likely to create ridging of any consequence, but happens to lie fairly close to the decimal equivalent of 7/12, namely, 0.5833 . . . . A slight error in setting N could lead to drifting into a condition of ridging (6 ridges displaced circumferentially 60° from one another). Care must be taken in setting N and it would be preferable to set it slightly higher rather than lower than 0.587. If, for example, the actual value of N drifted to 0.59, the condition might cause 50 ridges displaced about 7°, a situation not particularly offensive or readily discernible. The actual effect of using N=9.59 as against the theoretical 9.5868 . . . is insignificant in respect to complying with the $L_{crit}$ criterion, the difference being less than 4 parts per thousand. The product $N \cdot R_f$ would be trivially too high and the effect on S would be insignificant, even in the outermost wraps of the first lamella which is the only location where fiber lengths approach the upper length limit allowed. If there is some concern about this effect, the first change radius $R_c$ can be dropped slightly below 1.2 $R_i$ (that is, below 1.5 cm).

In any event, assume the first $R_c$ is taken as 1.5 cm. At this stage of the winding a discrete change in N is to be made. Since the second lamella will have a median radius, $R_f$, about 1.2 times the median radius of the first lamella, the second value of N can be first determined as 9.5868÷1.2=7.989. This value is perilously close to the whole number 8, which could result in severe ridging. In fact, values of F from about 0.95 to 0.05 result in each successive wrap lying quite close to a predecessor and possibly creating some mild layering, if not ridging. It would be preferable to manipulate the second value of $R_f$ to find a more favorable second value of N. This can readily be accomplished by using for the second value of $R_f$ a smaller value than 1.2×1.375 cm. In fact, the first lamella can also be terminated slightly before it reaches an $R_c$ of 1.2×1.25, since the outermost wraps of fiber in that lamella had very slightly exceeded the +10% boundary around $L_{crit}$.

In any event, if the second $R_c$ is taken at 1.18× the first, the second N can be calculated as 9.5868÷1.18=8.1244. This is too close to F=0.125 (⅛) which produces four ridges at 90° displacement. A better choice would be to use 9.5868÷1.17=8.1938. At F=0.193, the second lamella can be wound to a radius of 1.76 cm. without exceeding the $L_{crit}$ criterion and without creating undue ridging.

For the third lamella, one would again try to determine a new value of N by dividing the second value by 1.2. Thus, the third N would be calculated as 8.193÷1.2=6.8275. The closest problem situation arises at F=0.826, which is the decimal equivalent of 19/23. If F=0.828 is used and carefully controlled, the third lamella can be completed without violating $L_{crit}$ and without severe ridging. At the end of the winding of the third lamella the bundle radius will have attained the value 1.76×1.2=2.1 cm. A fourth and subsequent lamellae can be further wrapped on the bundle making appropriate adjustments to N at selected radii $R_c$, as illustrated, until the desired maximum bundle radius $R_o$ has been reached.

When winding is complete a self-supporting annular bundle is removed from the mandrel. One or both ends may be infused with potting compound which is cured and severed according to methods taught in issued U.S. Pat. Nos. 4,207,192; 4,210,536; and 4,220,489. Each fiber is thereby intersected and the bore thereof opened. If the potting and severing is performed only at one end of the bundle, each fiber will have both ends of its bore opened and exposed at a plane intersecting said potting medium. The individual fiber segments will form a loop having a total length, L, between the two open bore ends equal to 2S, as calculated according to the equation.

$$S = \sqrt{N^2 R_f^2 4\pi^2 + D^2}$$

Alternatively, the bundle may be potted and severed at each end, in which case the total length of fiber between its open bore ends will be simply S. In either case, the maximum distance between any point in the bore and an open end is half the distance between the open ends.

As previously noted, the fiber need not have both ends open, whether in the form of a single-potted loop or in the double-potted state. It is possible to sever the fibers at one end and seal them at the other. In this case, the maximum path length within the bore is the distance between the open and closed ends.

The critical limit of fiber length $L_{crit}$ has been defined as the distance between the ends of a fiber segment having both bore ends open; this is twice the maximum distance from a point of stagnation within the bore to an open end. $L_{crit}$ as a criterion for S, the straightened length of the fiber helix segment, is directly concerned with the flow factors in the bore from such a stagnation point to a bore outlet. Hence, in relating S to $L_{crit}$ one must take into account whether the fiber bundle has been potted and severed at one end to open all fibers at that end, potted and severed at both ends to provide fiber opening at each end, or potted, severed, and fibers sealed in such a fashion as to have only one bore end open.

S is a parameter describing a helical path length in a bundle. In the proper use of $L_{crit}$, 2S is not to exceed $L_{crit}$ for the case of the double-open-ended filament segments where all fiber bore openings appear in a common potting at one end of the bundle. In the case of double-open-ended filament segments with bore openings appearing in separate pottings at opposite ends of the bundle, the value S itself is not to exceed $L_{crit}$. The case of single open-ended filaments is similar in flow characteristics to that of the double open-ended bundle with both bore openings at one end in that the closed end and the approximate center of the double open-ended fiber both correspond to the maximum distance to a bore opening. Hence, in the one-end sealed case it is proper to use $L_{crit}$ as the criterion for limiting the value 2S.

Other approaches to the selection of values of N whose fractional portion F avoids the problem of creating ridges will be apparent when certain additional factors are taken into account. First, it should be noted that the adverse effect of bore flow pressure is experienced only when the fiber length is excessive. That is, fiber segment lengths shorter than $L_{crit}$, say even more than 10% shorter, do not contribute to deleterious flux or rejection effects. Therefore, for any lamella characterized by having an inner radius and an outer radius, one can select different values for N provided that the longest fiber segment is less than $1.1 L_{crit}$, and such that N has a fractional portion, F, which avoids the building of ridges. Second it is also important to note that the consequence of a particular ridging value of F may be more or less deleterious at different radial positions in the bundle, and there may be a wider choice of values for N to avoid ridging as the bundle diameter grows. Thirdly, the extent and seriousness of ridging with respect to the circumferential displacement of wraps will be influenced by the size and number of filaments being wound as a group.

The specific example provided herein for avoiding ridging and complying with the $L_{crit}$ criterion is set forth as an example only and should not be considered limiting.

A module constructed in accordance with the teachings of this invention is designated in the Figs. generally by the numeral 20. The module in completed form is seen in FIGS. 1-5 and includes an annular bundle 22 formed of lamellae of helically wound semi-permeable hollow polymeric filaments and braid sleeve 26 folded over to sandwich the filaments for the most part between inner and outer sleeve sections 26a and 26b with solid rod 28 projecting within and occupying the annulus core 30.

The specific manner in which the bundle is wound has been described in detail above. The fibers which are of relatively large diameter are wound in helical fashion with adjacent layers wound in the opposite hand. There is relatively uniform distribution of the large diameter fibers and the channel spaces and surfaces of the fibers usable for separation. In the preferred embodiment the hollow fibers are 250 microns or greater in outside diameter. In certain applications 500 microns outside diameter is preferred. Although any suitable hollow fiber can be used, the preferred embodiment contemplates a composite hollow fiber comprising a porous substrate, overcoated with a selected high filtration rejection barrier.

Figure 1:
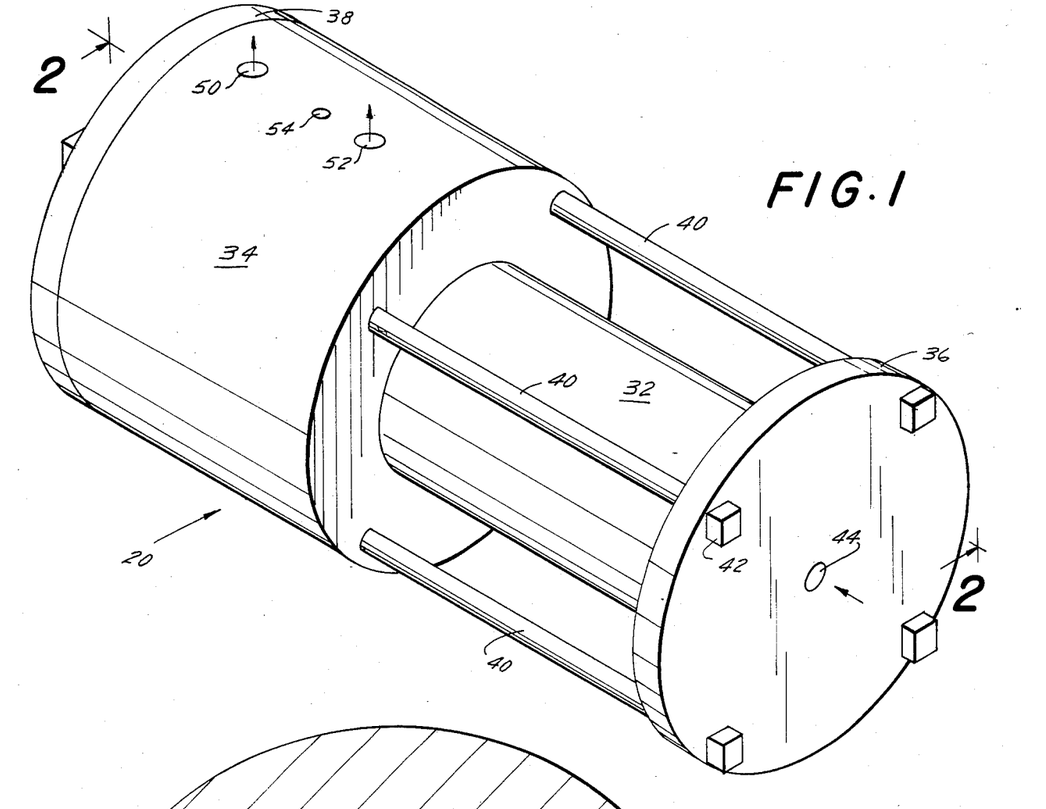
FIG. 1 is a perspective view of a hollow filament separatory module utilizing a hollow fiber bundle constructed in accordance with the teachings of this invention.
Figure 2:
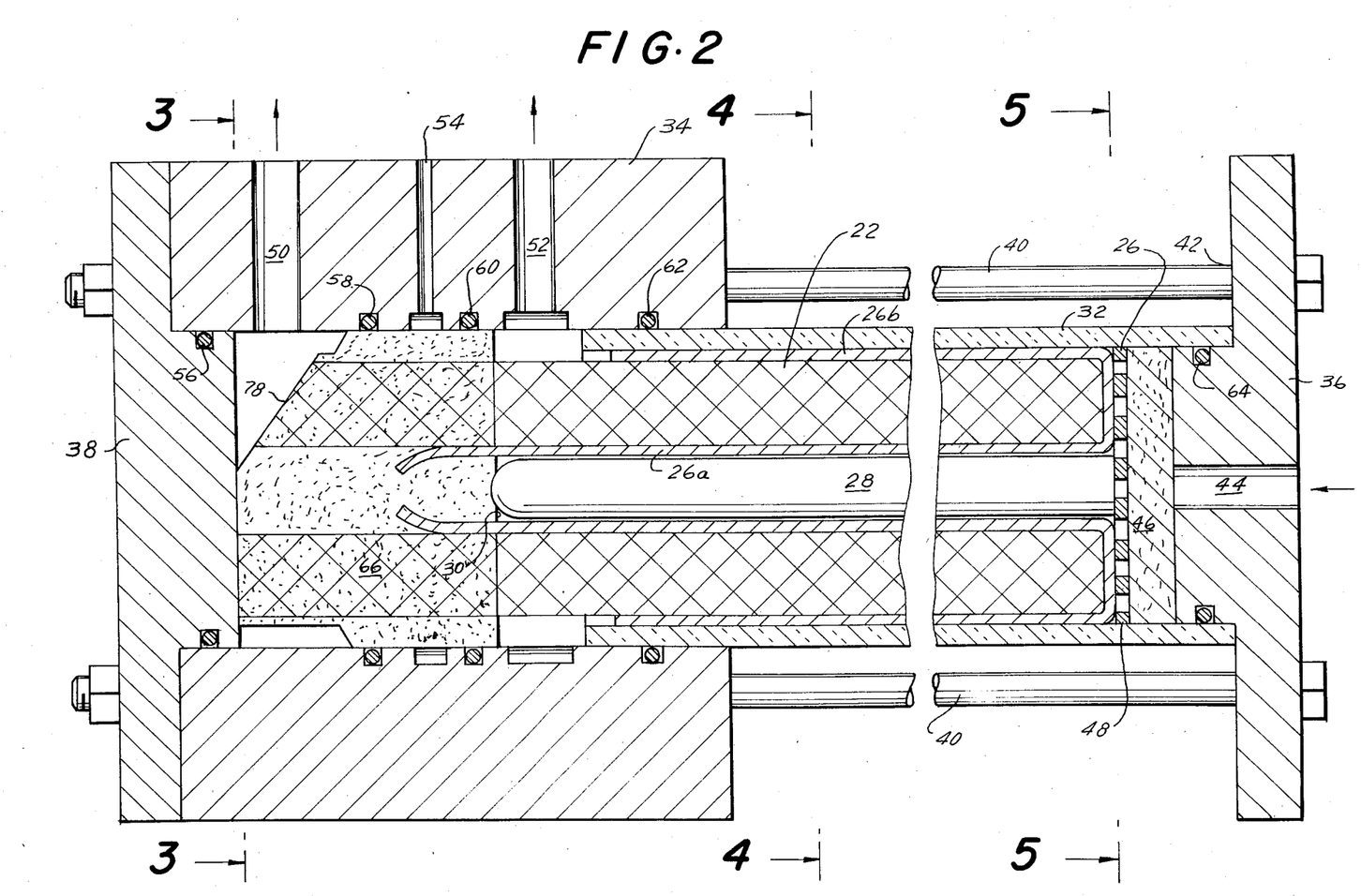
FIG. 2 is a partially sectional longitudinal view of the module shown in FIG. 1 taken along the line 2—2 in the direction of the arrows therein.
Figure 3:
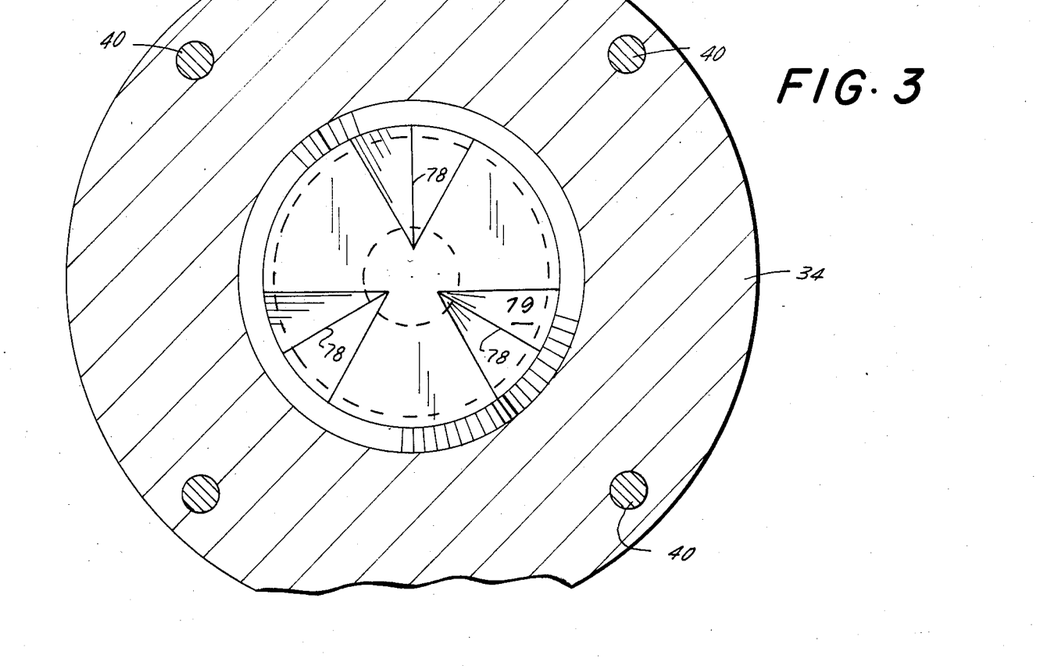
FIGS. 3, 4 and 5 are transverse sectional views taken respectively along the lines 3—3, 4—4 and 5—5 in the direction of the arrows in FIG. 2.
Figure 4:
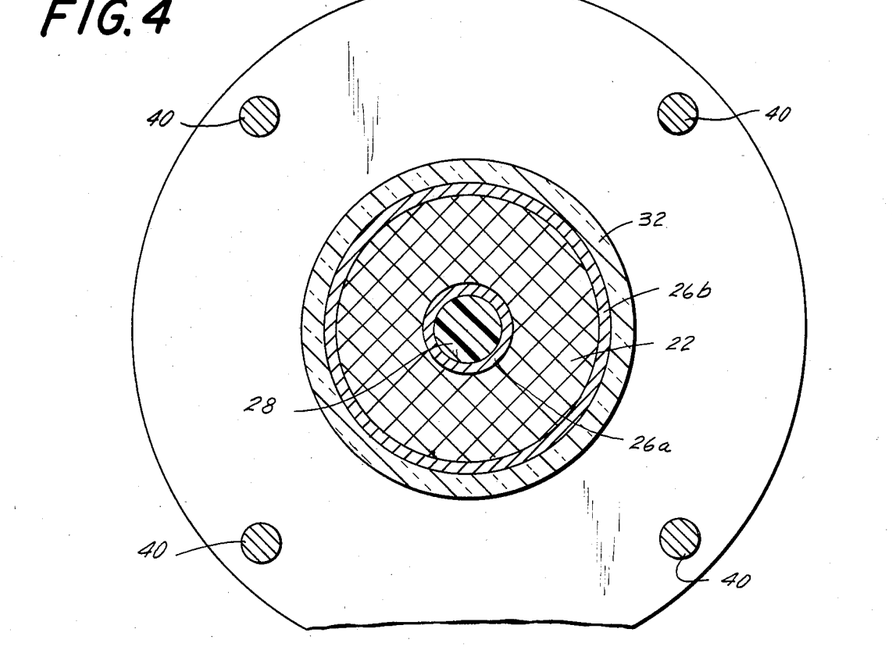
Figure 5:
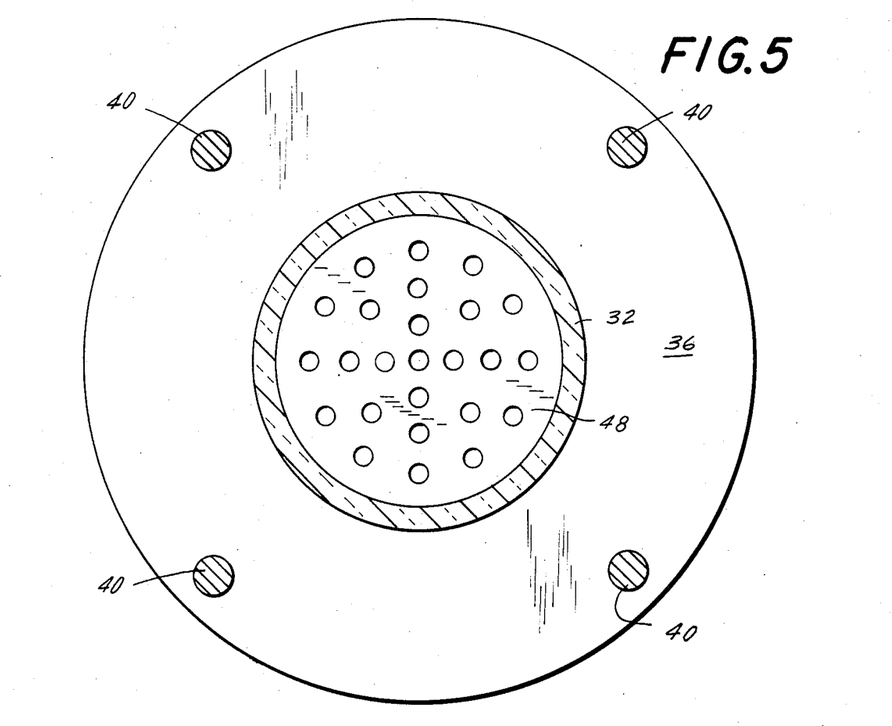

The annular bundle 22 is encased within pressure resistant shell 32 and pressure sleeve 34 between end plates 36 and 38 held in position by stringers 40 passing through holes 42 formed in the end plates. Axial feed-in port 44 is provided in end plate 36 to allow the fluid which is being operated upon to wash the outside of the fibers 22 after passing through prefilter 46 and perforated disk 48. In certain applications either or both prefilter 46 and disk 48 can be omitted. In the preferred embodiment prefilter 46 is a felt structure thought which the liquid can pass and disk 48 is a rigid plastic member.

The pressure sleeve 34 is provided with radial ports 50 and 52 which respectively provide outlets for permeate and concentrate. Port 54 functions as a weep hole. Suitable O-rings 56, 58, 60, 62, and 64 are provided. The end of annulus 22 within pressure sleeve 34 is encased in potting compound 66.

The manner of winding annular bundle 22 is seen in FIGS. 6 through 14. Collapsible expansible braided sleeve 26 is secured over suitable winding shaft 68 for a distance greater than the axial length of the annulus to support the inner surface of the annulus. This is the surface immediately upon which the first wraps of the bundle 22 are wound. An additional length of expansible sleeve sufficient to provide a continuous protective surface for the external surface of the annulus, rolled around one end of the annulus, is provided.

Figure 10:
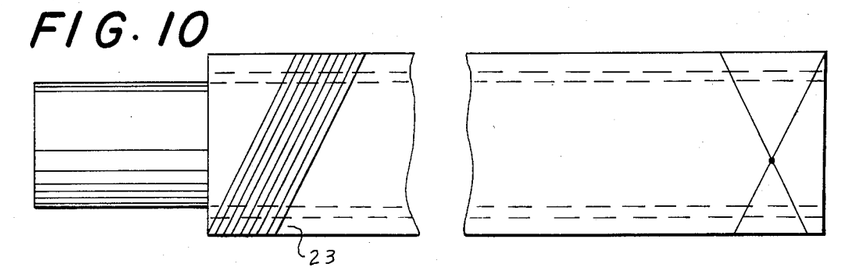
FIGS. 10, 11 and 12 are partially diagrammatic longitudinal segmentary views illustrating the winding respectively of the first, an intermediate and an outer lamella comprising the annular bundle.
Figure 11:
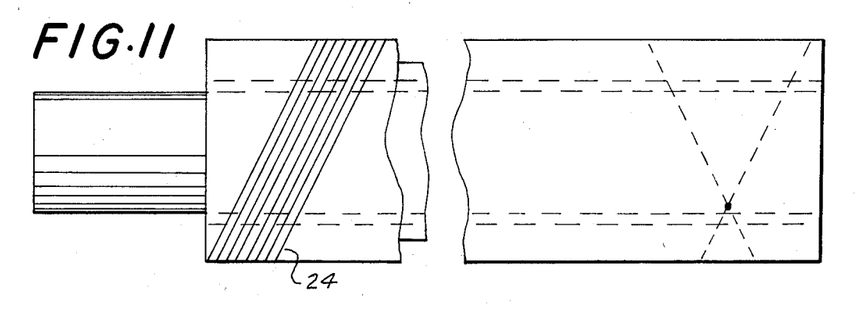
Figure 12:
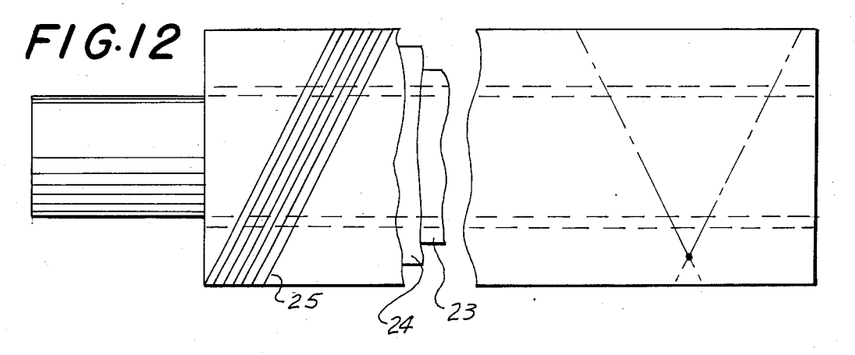
Figure 13:
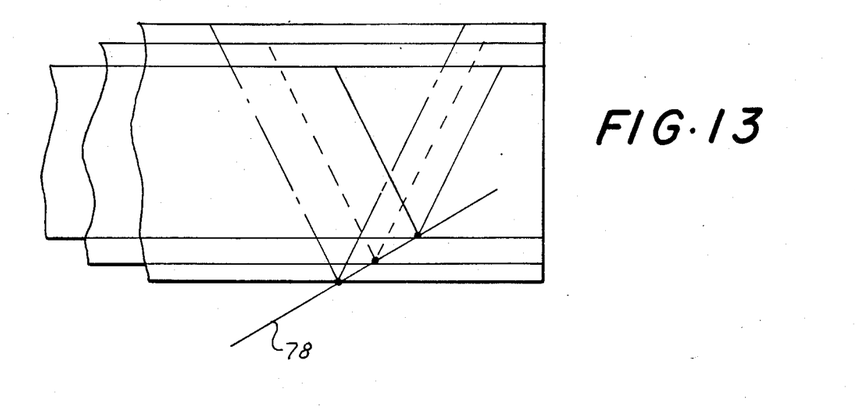
FIG. 13 is a diagrammatic view of inner, outer, and intermediate helical angles.

In the figures the first lamella of helical winding by way of example is indicated by the numeral 23, a second by the numeral 24, and a third by the numeral 25, there being adjacent intermediate unindicated windings wound in opposite hand.

Figures 6, 7, 8, 9:
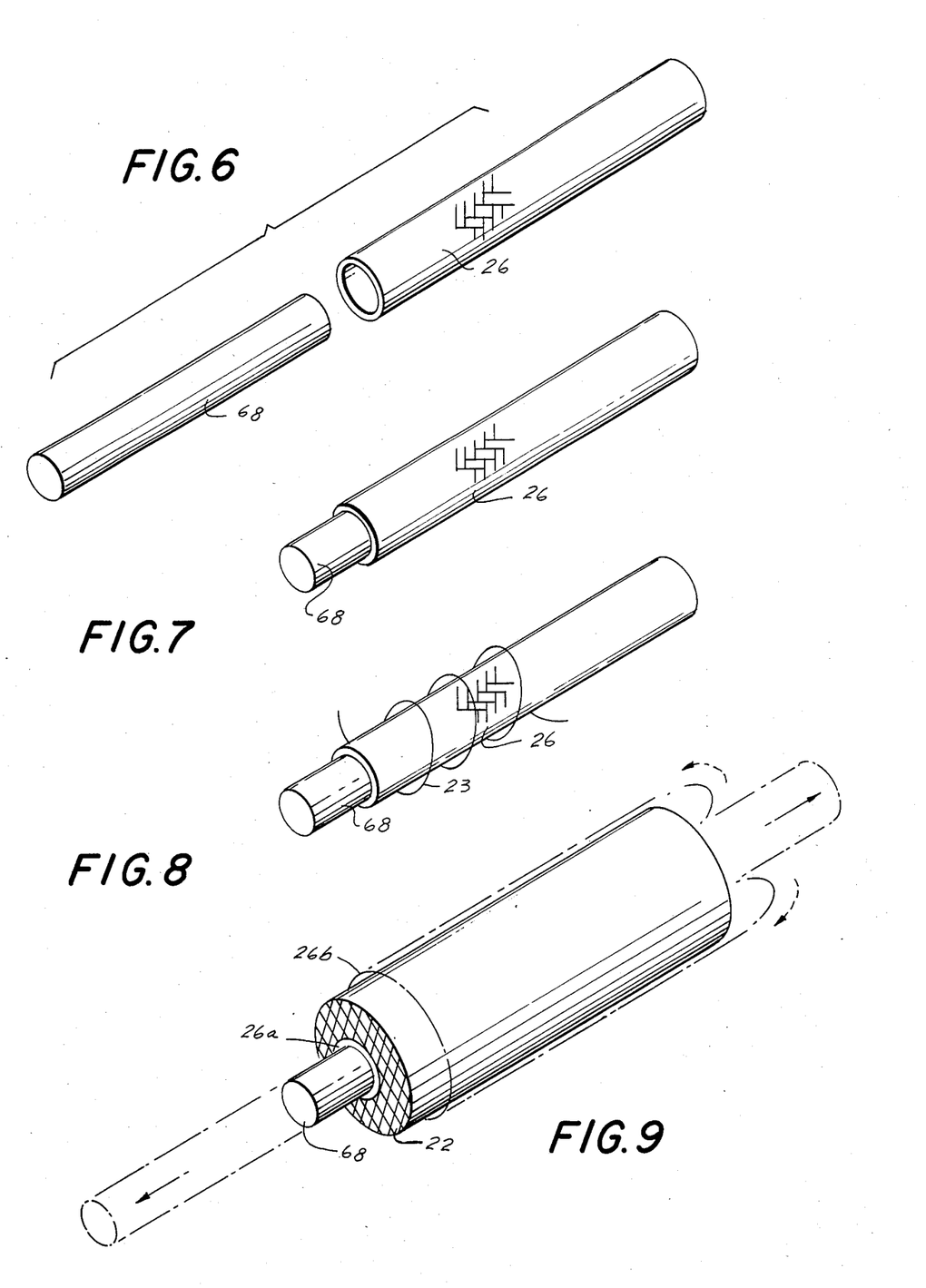
FIG. 6 is an exploded perspective view of cylindrical winding support shaft and collapsible expansible sleeve about which hollow filaments are wound during the fabrication of the fiber bundle of the module shown in FIG. 1.
FIG. 7 is a perspective view of the support shaft with the sleeve in position thereon prior to winding.
FIG. 8 is a perspective view of support shaft and sleeve with the fiber helix being wound thereon to provide the fiber bundle.
FIG. 9 is a perspective view illustrating removal of the support shaft and stretching and folding of the sleeve after completion of the winding of the bundle.
Figure 14:
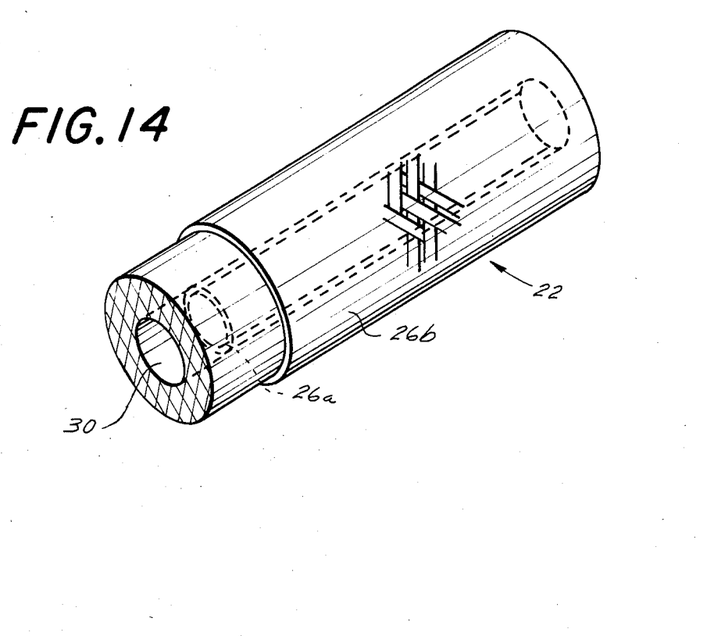
FIG. 14 is a perspective view illustrating the relative positions of bundle annulus and collapsible, expansible sleeve in the completed bundle.

Upon completion of the winding operation the fiber bundle and associated braided jacket, if one has been employed, are removed from the mandrel 68.

Where the braided jacket is used the outer end 26b of the braid is wrapped over the annulus 22 with the inner end 26a of the braid left within. Either or both ends of the bundle may be potted and the fiber bores exposed within the potting zones all according to various steps such as those described in the issued patents referred to above or by any other appropriate means. Such subsequent steps are not regarded as critical in connection with the invention, it being understood that the present teachings concern the method and product created by generating specified helical path lengths of hollow fiber segments having one or both bore ends open.

I claim:

1. In a bundle of permselective hollow fibers to be used in pressure driven separations wherein fiber length is controlled to avoid adverse permeability and selection capabilities the improvement consisting of a plurality of radially displaced annular lamellae of said bundle, each lamella comprising a plurality of wraps of helical segments of fiber in which adjacent helical fiber segments are positioned in helices of opposite hand, each said helical segment of fiber within a respective lamella lying at a radial position $R_f$ substantially constant over a length of said bundle and with all wraps which comprise any given lamella incorporating helical segments each of whose radial position $R_f$ may differ incrementally from one to another segment but with each segment having the same number of turns N per length D; N in each lamella being such that helix paths within each respective lamella are displaced circumferentially and successive traverses of common hand do not overlie one another and thereby substantially avoid helical ridges and each such value of N varies between successive lamellae of increasing median radius.

2. The bundle of claim 1 in which said permselective hollow fibers are a composite comprising a porous substrate overcoated with a rejection barrier.

3. An apparatus including the bundle of claim 2, in which means are provided so that pressurized feed is introduced at one end of said bundle in order to flow over outside surfaces of said hollow fibers in a direction generally parallel to an axis of said bundle.

4. An apparatus including the bundle of claim 1, in which means are provided so that pressurized feed is introduced at one end of said bundle in order to flow over outside surfaces of said hollow fibers in a direction generally parallel to an axis of said bundle.

5. A bundle in accordance with claim 1 in which an outside diameter of said hollow fibers is above 100 microns.

6. A bundle in accordance with claim 1 in which an inside diameter of said hollow fibers is between 0.2 and 0.9 times said outside diameter.

7. The bundle of claim 1, in which said hollow fibers have an outside diameter of between $100\mu$ and $1000\mu$ and inside diameter between 0.3 and 0.8 times said outside diameter.

8. An apparatus including the bundle of claim 7, in which means are provided so that pressurized feed is introduced at one end of said bundle in order to flow over outside surfaces of said hollow fibers in a direction generally parallel to an axis of said bundle.

9. The bundle of clam 7 in which said permselective hollow fibers are a composite comprising a porous substrate overcoated with a high filtration rejection barrier for use in reverse osmosis applications.

10. An apparatus including the bundle of claim 9, in which means are provided so that pressurized feed is introduced at one end of said bundle in order to flow over outside surfaces of said hollow fibers in a direction generally parallel to an axis of said bundle.

* * * * *